(12) United States Patent
Dreulle et al.

(10) Patent No.: US 6,406,812 B1
(45) Date of Patent: Jun. 18, 2002

(54) CONTINUOUS CURRENT SUPPLY FOR ELECTRICAL AUTOMOTIVE VEHICLE

(75) Inventors: Claude Maurice Pierre Dreulle, Beaurains; Pierre Georges Gerard Lenain, Arras, both of (FR)

(73) Assignee: Oldham France S.A., Arras (FR)

( * ) Notice: Subject to any disclaimer, the term of this patent is extended or adjusted under 35 U.S.C. 154(b) by 0 days.

(21) Appl. No.: 09/556,665

(22) Filed: Apr. 24, 2000

(30) Foreign Application Priority Data

Apr. 23, 1999 (FR) .......................................... 99 05198

(51) Int. Cl.[7] .......................... H01M 2/10; B60R 16/04
(52) U.S. Cl. ......................... 429/99; 429/100; 429/96; 429/157; 429/158; 429/159; 429/156; 429/163; 429/176; 180/68.5
(58) Field of Search .................... 429/99, 157, 100, 429/159, 163, 158, 176, 156, 96; 180/68.5

(56) References Cited

U.S. PATENT DOCUMENTS 2,942,058 A  6/1960  Herold
5,140,744 A  8/1992  Miller
5,441,123 A * 8/1995  Beckley ..................... 180/68.5
5,477,936 A  12/1995  Sugioka et al.
5,709,280 A * 1/1998  Beckley et al. ............ 180/68.5
5,866,276 A  2/1999  Ogami et al.

FOREIGN PATENT DOCUMENTS

| EP | 0 575 060 | 12/1993 |
| EP | 0 620 604 | 10/1994 |
| EP | 0 662 725 | 7/1995 |
| FR | 694508 | 12/1930 |
| GB | 905 222 | 9/1962 |
| GB | 2 081 495 | 2/1982 |
| JP | 1-134851 | 5/1989 |
| JP | 7-142046 | 6/1995 |
| JP | 9-106831 | 4/1997 |
| JP | 10-27591 | 1/1998 |

* cited by examiner

Primary Examiner—Gabrielle Brouillette
Assistant Examiner—Angela J. Martin
(74) Attorney, Agent, or Firm—Young & Thompson

(57) ABSTRACT

This direct current power supply for electric vehicles includes a modular set of electrical storage batteries (16) which are electrically interconnected. The batteries are disposed in battery boxes (18, 20) which can be stacked to constitute a stack of modules (12, 14).

15 Claims, 3 Drawing Sheets

CONTINUOUS CURRENT SUPPLY FOR ELECTRICAL AUTOMOTIVE VEHICLE

BACKGROUND OF THE INVENTION

The present invention relates to a direct current power supply for electric vehicles, of the type including a modular set of electrical storage batteries which are electrically interconnected.

It is in particular intended for supplying power to electric materials handling vehicles.

The power supplies of electric vehicles conventionally use a set of batteries each of which is capable of delivering a voltage of the order of 2 volts or a multiple of 2 volts, for example, the batteries being connected in series or in parallel inside a battery box accommodated in a housing provided for this purpose in the vehicles.

Obviously, to reduce the number of battery charging and discharging cycles, and consequently to increase their service life, it is necessary to use a large number of onboard batteries to provide sufficient electric power.

SUMMARY OF THE INVENTION

The object of the invention is to provide a power supply for electric vehicles which is capable of containing a large number of storage batteries in a small space.

It therefore consists in a power supply of the aforementioned type characterized in that the batteries are disposed in battery boxes which can be stacked to constitute a stack of modules.

Thus the general overall size of the power supply is adapted to suit the number of onboard batteries and unoccupied free space is therefore reduced.

Various embodiments of a power supply according to the invention can further include one or more of the following features, individually or in all technically feasible combinations:

- at least one of the battery boxes includes a housing adapted to receive a battery charger for charging said batteries;
- a portion of at least one of the battery boxes has a lateral wall delimiting a passage for cables for connecting the batteries;
- the lateral wall of at least part of the battery boxes includes openings for ventilating the batteries;
- the lateral wall of said battery boxes is higher than the batteries and the openings are delimited by cutouts formed in the projecting edge area of said lateral wall; and
- the lateral wall of the battery boxes includes handling means adapted to cooperate with lifting equipment.

BRIEF DESCRIPTION OF THE DRAWINGS

Other features and advantages will emerge from the following description, which is given by way of example only and with reference to the accompanying drawings, in which.

DESCRIPTION OF THE PREFERRED EMBODIMENTS

Figure 1:
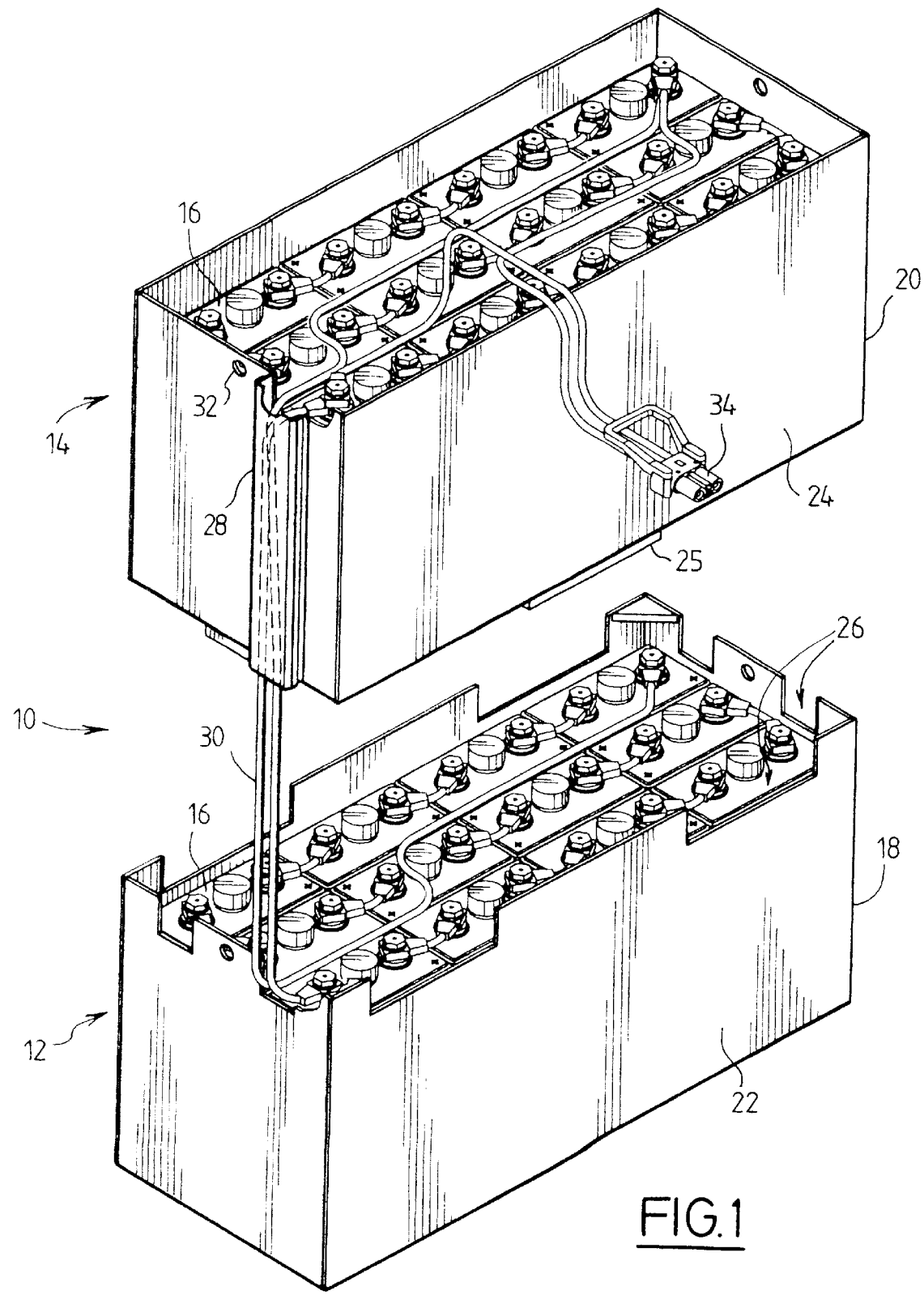
FIG. 1 is a perspective view of a power supply according to the invention, showing two modules in the process of being stacked.

FIG. 1 is a perspective view of a power supply 10 in accordance with the invention for electric vehicles, shown during assembly.

For example, it can constitute a power supply for electric materials handling vehicles.

The figure shows that the power supply 10 includes an assembly made up of a lower module 12 and an upper module 14 each consisting of associated electrical storage batteries 16 each of which is capable of delivering a voltage equal to 2 volts, for example, the batteries being electrically connected in parallel or in series.

More particularly, the batteries 16 of the modules are disposed in a lower battery box 18 and an upper battery box 20.

In the embodiment of the invention shown in this figure the power supply consists of the combination of the two modules 12 and 14.

Of course, a greater number of such modules could be provided, depending on the onboard electrical power required by the vehicle.

Figure 2:
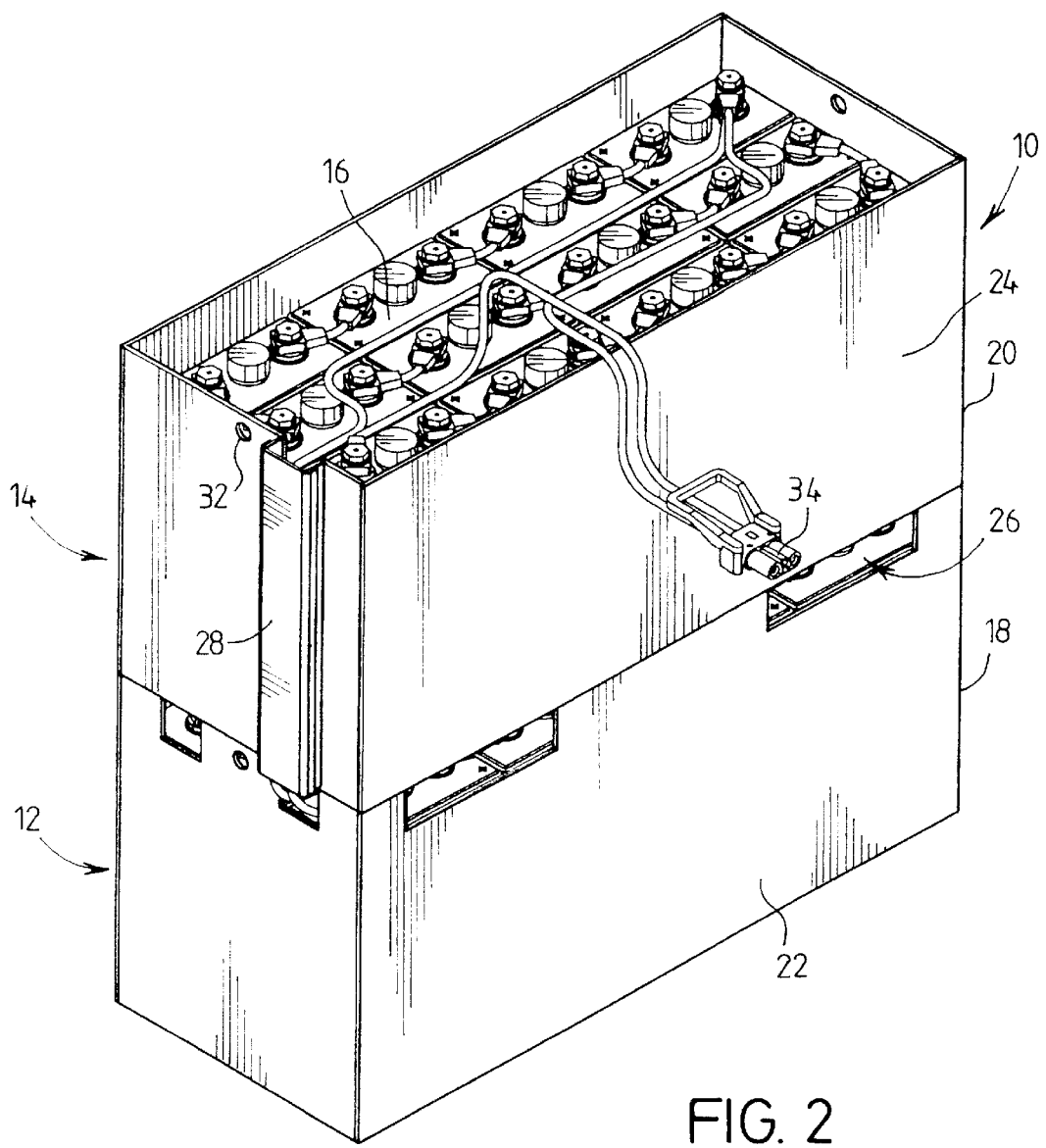
FIG. 2 shows the power supply from FIG. 1 after stacking the modules.

As shown also in FIG. 2, the battery boxes 18 and 20 can be stacked.

The battery boxes 18 and 20 are each parallelepiped-shaped and their cross sections have substantially identical dimensions.

Also, the respective lateral walls 22 and 24 of the battery boxes 18 and 20 are higher than the batteries 16 and therefore extends upward beyond the top face of the batteries.

The large bottom face of the top battery box 20 has feet, like the foot 25, adapted to nest in the upper edge area of the lateral wall 22 of the lower battery box 18, these parts having complementary shapes.

The upper edge area of the wall 22 of the lower battery box 18 includes cutouts 26 for ventilating the batteries 16.

As previously mentioned, the batteries in each battery box 18 and 20 are electrically interconnected in series or in parallel.

It can equally be seen that the modules are also connected two-by-two in series or in parallel.

If the batteries 16 are connected in parallel, the modules are connected in series.

On the other hand, if the batteries are connected in series, the modules are connected in parallel.

To this end, the wall 24 of the upper battery box 20 is shaped to provide a passage 28 for a module-connecting cable 30.

Each battery box 18 and 20 is completed by handling means 32 consisting of openings adapted to cooperate with lifting equipment for mounting or demounting them.

Clearly, when stacked, the power supply just described has minimum overall dimensions given that unoccupied free space is reduced.

Also, connecting the supply 10 to the electric vehicle is greatly simplified because the modules are electrically interconnected and a single electrical connector 34 is therefore all that is needed to make the connection.

Figure 3:
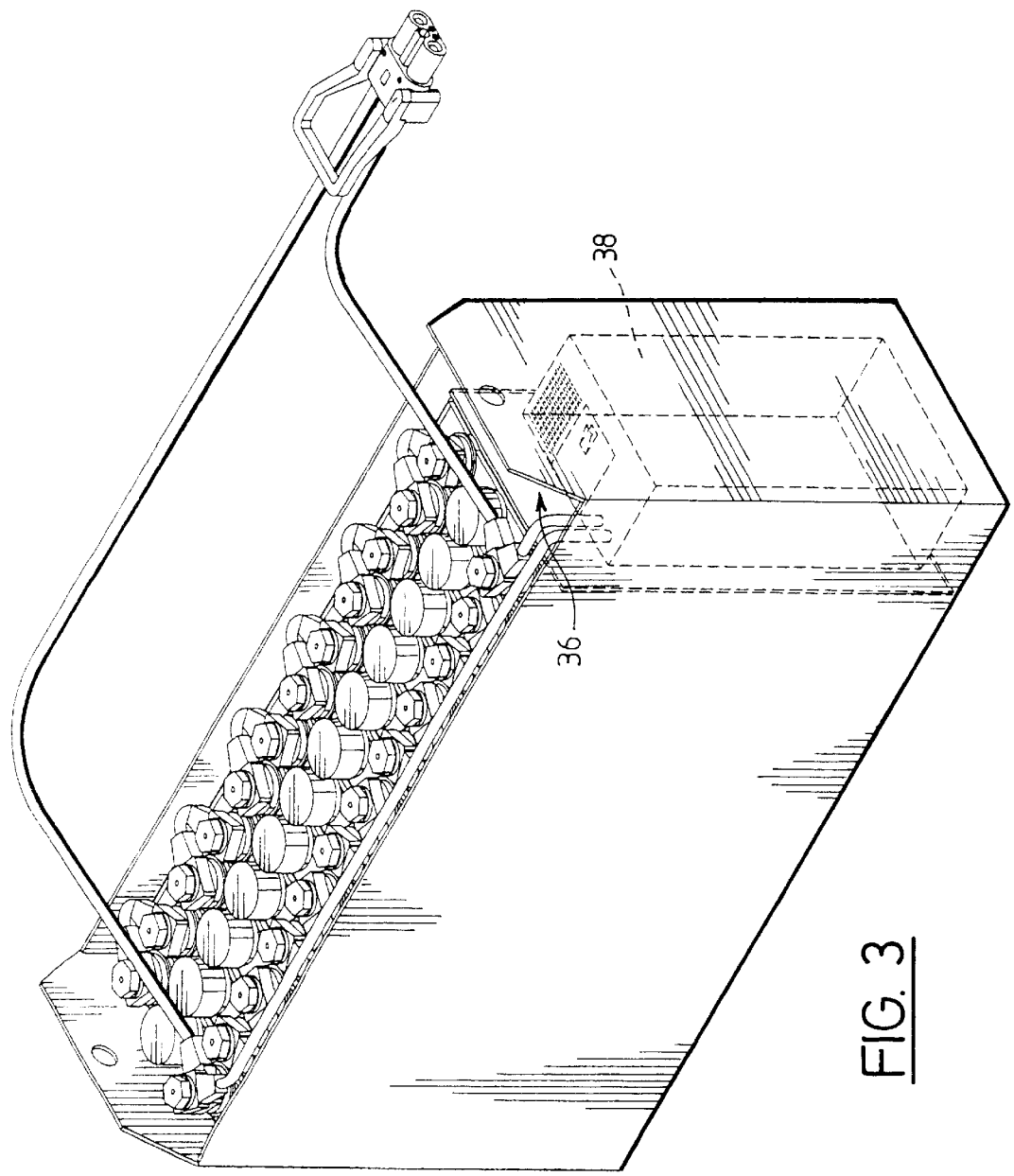
FIG. 3 is a perspective view of a particular module that can be incorporated into the power supply from FIGS. 1 and 2.

FIG. 3 shows that it is possible to provide, at one level, a battery box with a housing 36 adapted to receive a battery charger 38. This greatly facilitates charging the batteries.

Note that the invention just described is not limited to the embodiment described.

In a variant mobile partitions could be provided in each battery box to separate the batteries or delimit the housing which receives the battery charger.

What is claimed is:

1. A direct current power supply for electric vehicles, comprising modular stackable battery boxes, each of said boxes being structured and arranged to contain electrically interconnected electrical storage batteries, a first of said battery boxes being structured and arranged to be stacked on a second of said battery boxes and includes a lateral wall delimiting a passage for cables for connecting the batteries in said first battery box with the batteries in said second battery box.

2. The power supply of claim 1, wherein at least one of the first and second battery boxes includes a housing adapted to receive a battery charger for charging said batteries.

3. The power supply of claim 1, wherein the first and second battery boxes each includes ventilation openings for ventilating the batteries contained therein.

4. The power supply of claim 3, wherein each of the openings is delimited by a cutout formed in a projecting edge area of a lateral wall.

5. The power supply of claim 1, wherein a lateral wall of each battery box includes handling means adapted to cooperate with lifting equipment.

6. The power supply of claim 1, wherein said passage is an enclosure that extends from an exterior surface of said first lateral wall.

7. A battery box for an electric vehicle, the box being structure and arranged to contain electrically interconnected electrical storage batteries and comprises a first lateral wall forming a passage for cables for connecting the batteries contained in the battery box to terminals outside the battery box.

8. The battery box of claim 7, further comprising a housing adapted to receive a battery charger for charging said batteries.

9. The battery box of claim 7, further comprising a ventilation opening for ventilating the batteries contained therein.

10. The battery box of claim 9, wherein the opening is delimited by a cutout formed in a projecting edge area of a lateral wall.

11. The battery box of claim 7, further comprising handling means located on opposing lateral walls adapted to cooperate with lifting equipment.

12. The battery box of claim 7, in combination with a second battery box, the first mentioned battery box and the second battery box being structured and arranged for stacking the first mentioned battery box on the second battery box.

13. The battery box of claim 7, wherein said passage is an enclosure that extends from an exterior surface of said first lateral wall.

14. A direct current power supply, comprising:

a first battery box housing plural first batteries that are electrically connected to each other;

a second battery box housing plural second batteries that are electrically connected to each other, a bottom of said second battery box being removably carried on a top of said first battery box to form a stack of said first and second battery boxes;

an electrical connection cable connecting said plural first batteries to said plural second batteries; and an enclosed cable conduit within a lateral wall of said second battery box, said electrical connection cable being routed through said cable conduit.

15. The power supply of claim 14, wherein said enclosed cable conduit is a bulge in an exterior surface of said lateral wall of said second battery box.

* * * * *